United States Patent
Harrington et al.

(10) Patent No.: US 9,888,106 B2
(45) Date of Patent: Feb. 6, 2018

(54) SATELLITE TERMINAL WIRELESS VOLTAGE CONTROL

(71) Applicants: Emanuel Harrington, Bowie, MD (US); Douglas Ricker, Frederick, MD (US)

(72) Inventors: Emanuel Harrington, Bowie, MD (US); Douglas Ricker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/097,655

(22) Filed: Apr. 13, 2016

(65) Prior Publication Data
US 2017/0302777 A1    Oct. 19, 2017

(51) Int. Cl.
| | | |
|---|---|---|
| H04B 7/185 | (2006.01) | |
| H04M 1/725 | (2006.01) | |
| H04B 7/155 | (2006.01) | |
| H04W 52/02 | (2009.01) | |

(52) U.S. Cl.
CPC .... H04M 1/72533 (2013.01); H04B 7/15528 (2013.01); H04B 7/18528 (2013.01); H04W 52/0203 (2013.01); H04W 52/0235 (2013.01)

(58) Field of Classification Search
CPC ............. H04W 52/02; H04W 52/0203; H04W 52/0209; H04W 52/0235; H04B 1/1615; H04B 7/18528; H04B 7/1858; H04B 7/18582; H04B 7/185; H04B 7/1851; H04B 7/18521; H03Q 3/00; H03Q 3/005; H01Q 3/00; H01Q 3/005
See application file for complete search history.

(56) References Cited

U.S. PATENT DOCUMENTS

| | | | | |
|---|---|---|---|---|
| 5,678,228 A | * | 10/1997 | Soleimani | H04B 7/18517 370/311 |
| 5,797,083 A | * | 8/1998 | Anderson | H01Q 1/1257 342/359 |
| 6,934,512 B2 | * | 8/2005 | Meirzon | H04B 7/18517 455/12.1 |
| 6,965,581 B2 | * | 11/2005 | Nguyen | H01Q 1/1257 370/278 |
| 9,413,425 B2 | * | 8/2016 | Tang | H01Q 3/005 |

(Continued)

*Primary Examiner* — Duc M Nguyen
(74) *Attorney, Agent, or Firm* — Edell, Shapiro & Finnan LLC; Richard C. Irving

(57) ABSTRACT

A satellite communication system, a method and a system are provided. In one aspect of the invention, an outdoor unit power source is connected to a switch of a satellite modem of an indoor unit. When the satellite modem receives a first signal from a wireless device, a first switch control signal is sent to the switch to open a connection between the outdoor unit power source and an inter-facility link connected to an antenna of an outdoor unit, thereby preventing power from flowing through the inter-facility link. When the satellite modem receives a second signal from the wireless device, a second switch control signal is sent to the switch to close a connection between the outdoor unit power source and the inter-facility link, thereby causing the power to flow through the inter-facility link. Other wirelessly received signals may cause various control signals to be sent via the inter-facility link.

18 Claims, 3 Drawing Sheets

(56) References Cited

U.S. PATENT DOCUMENTS

| | | | | |
|---|---|---|---|---|
| 2005/0272365 A1* | 12/2005 | Meirzon | ............ | H04B 7/18517 |
| | | | | 455/3.02 |
| 2009/0103596 A1* | 4/2009 | Buer | ........................ | H04B 1/40 |
| | | | | 375/222 |
| 2009/0224988 A1* | 9/2009 | Park | ..................... | H01Q 1/1257 |
| | | | | 343/703 |
| 2010/0164817 A1* | 7/2010 | Kaplan | ................ | H01Q 1/3275 |
| | | | | 343/713 |
| 2010/0262895 A1* | 10/2010 | Dale | ........................ | H04L 1/004 |
| | | | | 714/786 |
| 2011/0261494 A1* | 10/2011 | Li | ........................... | H01Q 1/50 |
| | | | | 361/91.1 |
| 2013/0322251 A1* | 12/2013 | Kotecha | ................ | H04W 28/24 |
| | | | | 370/236 |
| 2016/0165570 A1* | 6/2016 | Kim | ..................... | H04W 4/023 |
| | | | | 455/456.2 |
| 2016/0251115 A1* | 9/2016 | Barry | ..................... | B25H 3/006 |
| 2016/0308818 A1* | 10/2016 | Torres | ................. | H04L 61/1511 |

\* cited by examiner

SATELLITE TERMINAL WIRELESS VOLTAGE CONTROL

FIELD OF THE INVENTION

The invention relates to apparatuses and methods for wirelessly controlling power to an outdoor unit from an indoor unit of a satellite terminal. The invention further relates to wirelessly controlling activation and deactivation of control signals from a satellite modem of an indoor unit to an antenna of an outdoor unit of a satellite terminal. In addition, the invention relates to providing information from a satellite modem and receiving and displaying the information at a portable wireless device in wireless communication with the satellite modem.

BACKGROUND

A proper installation process for satellite terminals is to wait until all cabling connecting an indoor unit to an outdoor unit is completed before powering on the indoor unit. One or more cables connecting the indoor unit to the outdoor unit is referred to as an inter-facility link (IFL). Connecting cables after the indoor unit is powered on is called Hot Plugging. When Hot Plugging, a center conductor of the IFL cable can touch a cable ground shield, thereby creating a current surge, which typically causes the indoor unit to power cycle. Some cable surge events could damage components of the indoor unit.

While on a roof, after connecting the IFL cable(s) with the indoor unit powered off, proper installation protocol specifies that the indoor unit may then be powered on. In order to power on the indoor unit, an installer climbs down from a roof and enters a customer premises in order to power on the indoor unit. The installer may turn on various control signals from the indoor unit to the outdoor unit before climbing up a ladder to the roof to adjust and test the antenna. When the installer wishes to turn off the various control signals and turn on other control signals, the installer must again climb down the ladder from the roof in order to enter the customer premises.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

One aspect of the invention is related to a satellite communication system. The satellite communication system includes a wireless device and a satellite modem. The satellite modem of an indoor unit includes at least one processing device connected with the wireless device, a switch, and an outdoor power source connected to the switch. The switch is arranged to receive a switch control signal from the processing device, which controls the switch to either provide power to an outdoor unit via an inter-facility link or prevent the power from being provided to the outdoor unit via the inter-facility link. When the at least one processing device receives a first signal from the wireless device, in response to the wireless device receiving the first signal, the at least one processing device sends a first switch control signal to the switch to open a connection between the outdoor unit power source and the inter-facility link, thereby preventing the power from flowing through the inter-facility link. When the at least one processing device receives a second signal from the wireless device, in response to the wireless device receiving the second signal, the at least one processing device sends a second switch control signal to the switch to close a connection between the outdoor unit power source and the inter-facility link, thereby allowing the power to flow through the inter-facility link.

In a second aspect of the invention, a method for use with a satellite communication system is provided. In the method, a wireless device receives either a first signal or a second signal. The wireless device provides the received first signal or the second signal to at least one processing device of a satellite modem of an indoor unit. Responsive to the at least one processing device receiving the first signal, a first switch control signal is output to a switch to open a connection between the outdoor power unit source, connected to the switch, and an inter-facility link connected to the switch, thereby preventing power from the outdoor unit power source from flowing through the inter-facility link. Responsive to the at least one processing device receiving the second signal, a second switch control signal is output to the switch to close a connection between the outdoor power unit source and the inter-facility link, thereby allowing the power to flow through the inter-facility link.

In a third aspect of the invention, a system is provided. The system includes a satellite modem, an antenna of an outdoor unit, an inter-facility link connecting the satellite modem with the antenna, a portable processing device having a wireless communication interface, and a wireless device having a physical connection to at least one processing device of the satellite modem. When the wireless device receives a first command from the portable processing device, the wireless device provides the first command to the at least one processing device. In response to receiving the first command from the wireless device, the at least one processing device accesses information and provides information to the wireless device. In response to receiving the information from the at least one processing device, the wireless device transmits the information to the portable processing device. In response to receiving the information from the wireless device, the portable processing device displays a representation of the information on a display screen of the portable processing device.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In order to prevent voltage from an IFL cable from being supplied to a block up converter (BUC), or radio, of an outdoor unit, either an installer makes sure that an indoor unit is in a powered off state or a direct current (DC) block may be used to block DC voltage from being supplied to the outdoor unit from the indoor unit via the IFL cable. Typically, a DC block may be used when an antenna of the outdoor unit is receiving power from a source other than the IFL cable.

One disadvantage of having the indoor unit in the powered off state is that, in order to power on the indoor unit, the installer enters the customer premises after all cable connections are completed.

A disadvantage of using the DC block on the IFL cable is that, in order to prevent Hot Plugging, the installer enters the customer premises to power off the indoor unit before removing the DC block and/or an in-line antenna pointing tool. This is inconvenient for the installer, increases installation time, and/or encourages the installer to improperly unplug and hot plug the IFL cable in order to save time.

Various embodiments of the invention provide a portable wireless device, which an installer may use to switch power on or off from an outdoor unit power source of the indoor unit to the IFL cable without entering the customer premises. Via the portable wireless device, the installer may independently activate and deactivate various control signals, may receive and display information from the satellite modem on a display screen of the portable wireless device, and may provide information to the satellite modem without entering the customer premises.

Description of Embodiments

Figure 1:
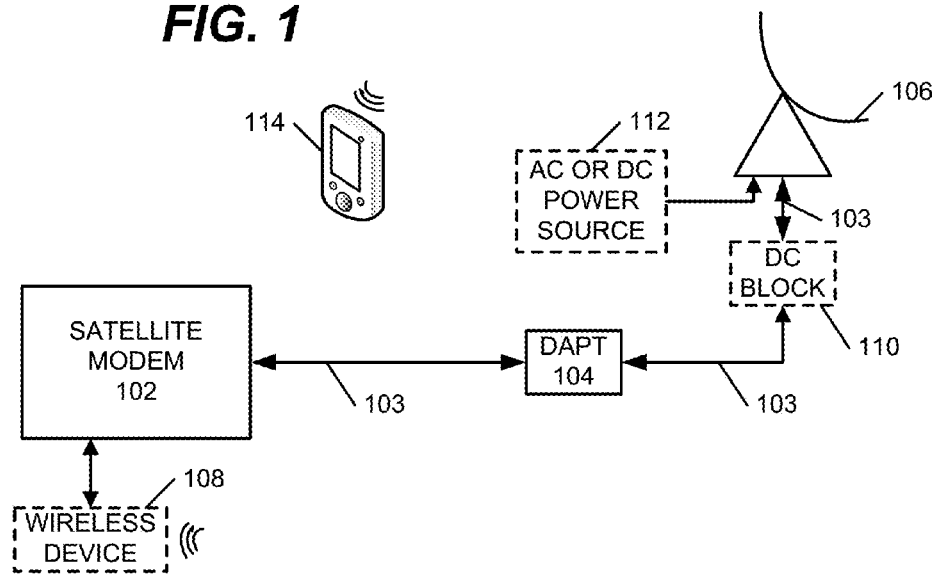
FIG. 1 illustrates an example operating environment for embodiments of the invention.

FIG. 1 illustrates an exemplary configuration including a satellite modem 102 of an indoor unit, an IFL cable 103 connecting satellite modem 102 of the indoor unit to a digital antenna pointing tool (DAPT) 104, IFL cable 103 connecting DAPT 104 to DC block 110, and IFL cable 103 connecting DC block 110 to antenna 106. Portable processing device 114 may include a display and, optionally, a keyboard, and may establish a wireless connection with satellite modem 102 via wireless device 108 or 204. Wireless device 108 may be physically connected to satellite modem 102 in order to provide wireless transmission and reception capability to satellite modem 102. Alternatively, a wireless device 204 (FIG. 2) may be included within satellite modem 102. In some embodiments, the wireless device included within satellite modem 102 may include a wireless router.

When a separate power source 112 provides power to antenna 106, a DC block 110 may be placed in line with respect to IFL cable 103 to block any power flowing through the IFL cables from reaching antenna 106.

Figure 2:
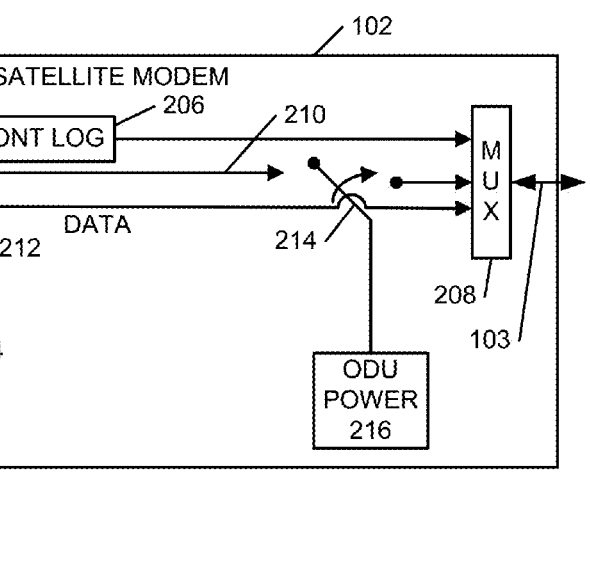
FIG. 2 illustrates a detailed view of a satellite modem depicted in FIG. 1.

FIG. 2 is a more detailed view of satellite modem 102. Satellite modem 102 may include a processing device 202, one or more control logic units 206, a switch control line 210, a data line 212, a multiplexer 208, a switch 214 and an outdoor unit (ODU) power source 216 connected to the switch. In addition, satellite modem 102 may include either a wireless device 204 such as, for example, a wireless router, or a connection to a wireless device 108 for sending and receiving wireless information.

Although FIG. 2 shows only one control logic unit 206, some embodiments may include multiple control logic units 206, each of which may provide output to multiplexer 208, which multiplexes multiple signals onto IFL cable 103. A signal is output via switch control line 210 from processing device 202 to switch 214. An open signal on switch control line 210 may cause switch 214 to open, thereby disconnecting ODU power source 216. A close signal on switch control line 210 may cause switch 214 to close, thereby connecting ODU power source 216 to IFL cable 103 through multiplexer 208. Data line 212 may provide data from processing device 202 to IFL cable 103 through multiplexer 208 and may provide data from IFL cable 103 to processing device 202 through multiplexer 208.

Figure 3:
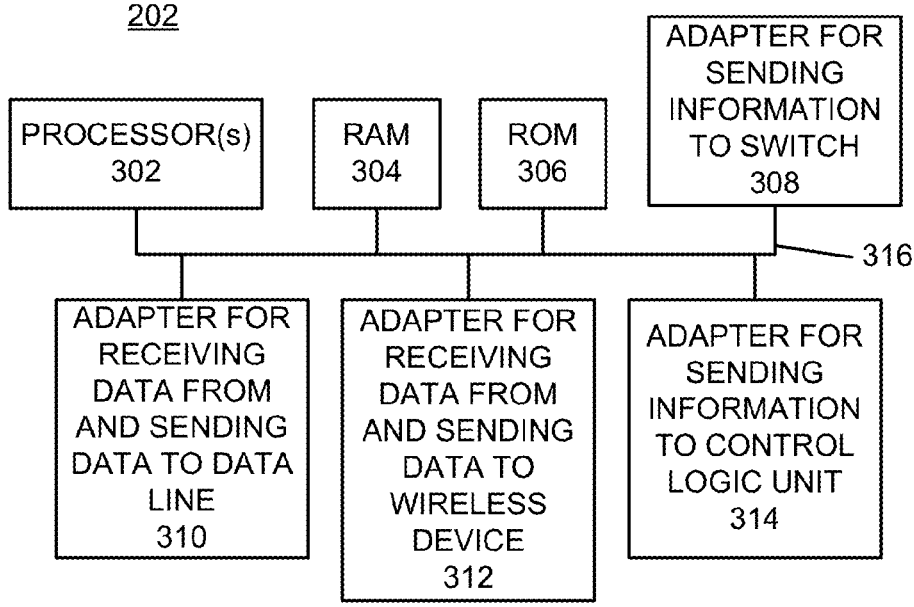
FIG. 3 is a functional block diagram of a processing device of a satellite modem depicted in FIG. 2.

FIG. 3 illustrates a functional block diagram of at least a portion of processing device 202 that may be included within satellite modem 102.

Processing device 202 may include one or more processors 302, a random access memory (RAM) 304, a read only memory (ROM) 306, an adapter 308 for sending information to switch 214 via switch control line 210, an adapter 310 for receiving and sending data between processing device 202 and multiplexer 208, an adapter 312 for receiving and sending data between processing device 202 and either wireless device 204 or wireless device 108, and an adapter 314 for sending information to control logic unit 206. Each of RAM 304, ROM 306 and adapters 308, 310, 312 and 314 may communicate with one or more processors 302 via a communication bus 316.

One or more processors 302 may execute instructions stored in ROM 306 and/or RAM 304. ROM 306 may store static information such as, for example, instructions for one or more processors 302 and static data. RAM 304 may store dynamic information such as, for example, data and/or intermediate or final processing results, as well as static information such as, for example, instructions for one or more processes 302 and static data.

In alternative embodiments, processing device 202 may include a field programmable gate array (FPGA), an application specific integrated circuit (ASIC), or other logic device, instead of functional components as shown in FIG. 3.

Figure 4:
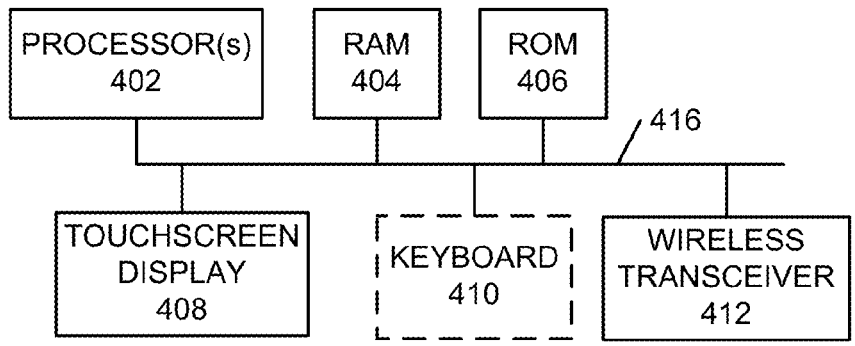
FIG. 4 is a functional block diagram of a portable processing device used with embodiments of the invention.

FIG. 4 illustrates a functional block diagram of at least a portion of portable processing device 114. Portable processing device 114 may include one or more processors 402, a random access memory (RAM) 404, a read only memory (ROM) 406, a touchscreen display 408, a wireless transceiver 412 and, optionally, a keyboard 410. Each of RAM 404, ROM 406, touchscreen display 408, wireless transceiver 412 and keyboard 410 may communicate with one or more processors 402 via a communication bus 416.

In some embodiments, wireless transceiver 412 may be a Wi-Fi transceiver. In other embodiments, wireless transceiver 412 may be a Bluetooth transceiver.

In some embodiments, instead of touchscreen display 408, portable processing device 114 may include a display screen, which may be used with keyboard 410.

One or more processors 402 may execute instructions stored in ROM 406 and/or RAM 404. ROM 406 may store static information such as, for example, instructions for one or more processors 402 and static data. RAM 404 may store dynamic information such as, for example, data and/or intermediate or final processing results, as well as static information such as, for example, instructions for one or more processes 402 and static data.

In alternative embodiments, processing device 202 may include a field programmable gate array (FPGA), an application specific integrated circuit (ASIC), or other logic device, instead of functional components as shown in FIG. 4.

In some embodiments, portable processing device 114 may be a smartphone.

Figure 5:
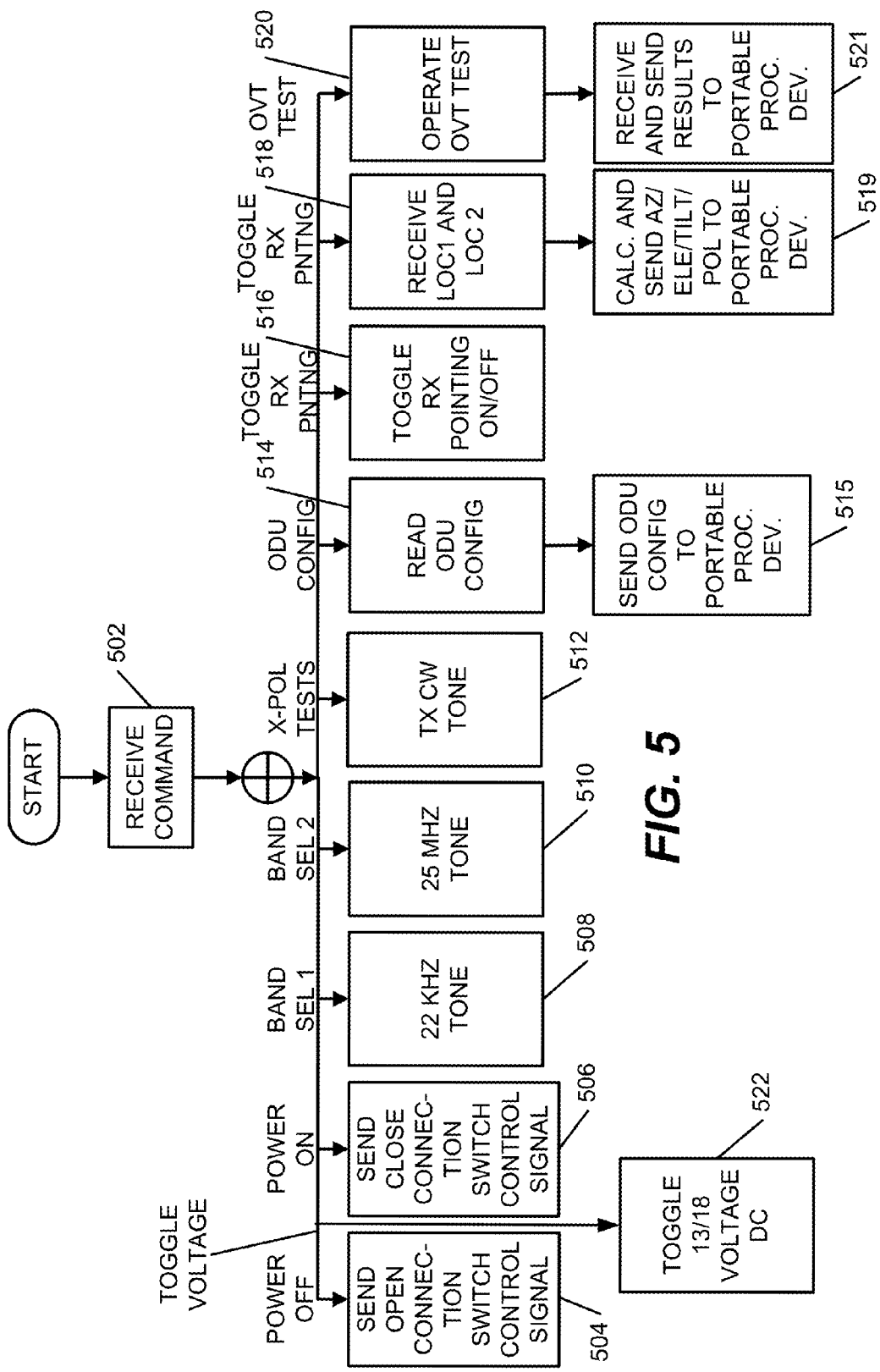
FIG. 5 is a flowchart that illustrates example processing in various embodiments of the invention.

FIG. 5 is a flowchart that illustrates processing in various embodiments. The process may begin with processing device 202 receiving a command from portable processing device 114 via wireless device 204 or wireless device 108 (act 502). The processing device may then determine a type of the command.

If the command is a power off command, then one or more processors 302 of processing device 202 may send an open switch command via adapter 308 and switch control line 210 to cause switch 214 to open, thereby breaking a connection between ODU power source 216 and IFL cable 103 (act 504).

If the command is a power on command, then one or more processors 202 may send a switch close command via adapter 308 and switch control line 210 to switch 214, causing switch 214 to close, thereby connecting ODU power source 216 to IFL cable 103 such that power for antenna 106 may flow through IFL cable 112 (act 506).

If the command is a toggle voltage command, if voltage is 13 volts DC, then voltage may be toggled to 18 volts DC, and if voltage is 18 volts DC, then voltage may be toggled to 13 volts dc (act 522). This may be implemented by processing device 202 recognizing the toggle voltage command received via wireless device 204 or 108 and then sending a signal to control logic unit 206 to toggle the voltage from 13 volts DC to 18 volts DC or vice versa. When the voltage is 13 volts DC, control logic circuitry in the ODU configures the antenna for cross polarization. When the voltage is 18 volts DC, the control logic circuitry in the ODU configures the antenna for co-polarization. In some embodiments, instead of using 13 volts DC and 18 volts DC, other voltage values may be used.

If the command is a select band one command then, in some embodiments, processing device 202 may send a signal to control logic unit 206, which may play a 22 kHz tone and may use a DiSEqC protocol to configure radio frequency (RF) electronics of antenna 106 to transmit and receive via a Ku band (act 508). In other embodiments, a different frequency tone may be played such as, for example, 1 MHz, 2.5 MHz or another frequency.

If the command is a select band two command then, in some embodiments, processing device 202 may send a signal to control logic unit 206, which may play a 25 MHz tone and may use the DiSEqC protocol to configure the RF electronics of antenna 106 to transmit and receive via a Ka band (act 510). In other embodiments, a different frequency tone may be played.

If the command is a transmit continuous wave (CW) command, then processing device 202 may send a signal to control logic 206, which may enable a transmit CW tone, thereby causing satellite modem 102 to transmit a signal to antenna 106 for antenna 106 to transmit a continuous wave, single frequency tone for measurement, calibration and fine alignment of antenna 106 (act 512).

If the command is a read outdoor unit (ODU) configuration file command, then one or more processors 302 of satellite modem 102 may access an ODU configuration file, that may be stored in RAM 304 or ROM 306 (act 514) and may provide a representation of the ODU configuration file to portable processing device 114, where the representation of the ODU configuration file may be displayed on touchscreen display 408 or a display screen (act 515).

If the command is a toggle receive pointing command, then processing device 202 may send a signal to control logic unit 206. If receive pointing is on, it will be toggled to off, and if the receive pointing is off it will be toggled to on. When receive pointing is toggled to on, satellite modem 102 may cause a receive pointing command to be transmitted to a satellite, thereby causing the satellite to send a signal, which may be used in conjunction with DAPT 104 for aligning antenna 106. When receive pointing is toggled to off, satellite modem 102 may cause a receive pointing off command to be transmitted to satellite, thereby causing the satellite to cease sending the signal for aligning antenna 106.

A graphical user interface (GUI) may be employed by portable processing device 114 such that a user and may use touchscreen 408 and the GUI to enter a first location of antenna 106 and a second location of a satellite. Alternatively, the GUI may be used with a display and the first location and the second location may be provided via a keyboard of portable processing device 114. As a result, portable processing device 114 may transmit, via a wireless interface, a pointing information command, including the first location and the second location, to processing device 202 of satellite modem 102 via wireless device 204 or 108. In some embodiments, wireless device 204 or 108 may include a Bluetooth transmitter and receiver. In other embodiments, wireless device 204 or 108 may include a Wi-Fi transmitter and receiver.

Processing device 202 may receive the pointing information command (act 518) and may determine an azimuth setting, an elevation setting, a tilt setting, and a polarization setting and may return the settings to portable processing device 114, through wireless device 204 or 108, for display on touchscreen display 408 or the display of portable wireless device 114 (act 519).

If the received command is an on-site validation tool (OVT) command, then satellite modem 102 may cause a command to be sent to a satellite gateway (not shown), which may operate an OVT test (act 520). Processing device 202 may receive results of the OVT test and may provide the results to portable processing device 114 for display on touchscreen 408 or a display screen (act 521).

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. For example, although examples of a satellite communication system were provided above as implementing various embodiments, the various embodiments may be implemented in other types of communication systems having delays of an order of magnitude less than delays found in a typical satellite communication system.

Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A satellite communication system comprising:
    a wireless device; and
    a satellite modem of an indoor unit, the satellite modem further comprising:
        at least one processing device connected with the wireless device,
        a switch, and
        an outdoor unit power source connected to the switch, the switch being arranged to receive a switch control signal from the at least one processing device, the switch control signal controlling the switch to either provide power to an outdoor unit via an inter-facility link or prevent the power from being provided to the outdoor unit via the inter-facility link, wherein:
        when the at least one processing device receives a first signal from the wireless device, the at least one processing device sends a first switch control signal to the switch to open a connection between the outdoor unit power source and the inter-facility link, thereby preventing the power from flowing through the inter-facility link,
        when the at least one processing device receives a second signal from the wireless device, the at least one processing device sends a second switch control signal to the switch to close the connection between the outdoor unit power source and the inter-facility link, thereby allowing the power to flow through the inter-facility link, and
        when the at least one processing device receives a third signal from the wireless device, the at least one processing device reads information from a file and provides the information to the wireless device for wireless transmission.

2. The satellite communication system of claim 1, wherein the wireless device is a wireless router included in the satellite modem.

3. The satellite communication system of claim 1, wherein the wireless device is external to the satellite modem and is physically connected to the satellite modem.

4. The satellite communication system of claim 1, wherein:
    the satellite modem further comprises:
        a multiplexor arranged to output to the inter-facility link,
        at least one control logic unit connected to the at least one processing device and arranged to provide at least one input to the multiplexer; and
    responsive to receiving one of a plurality of signals via the wireless device, the at least one processor provides one of a plurality of control signals to the at least one control logic unit to cause the at least one control logic unit to output a corresponding output control signal of a plurality of output control signals via the multiplexor and the inter-facility link.

5. The satellite communication system of claim 4, wherein the plurality of output control signals include at least one of a first voltage to configure a first type of polarization of an antenna, a second voltage to configure a second type of polarization of the antenna, a first tone to select a first frequency band, a second tone to select a second frequency band, a continuous wave tone to enable cross polarization testing and adjustments, and a receive pointing on/off control signal for antenna alignment.

6. The satellite communication system of claim 1, wherein:
    when the at least one processing device receives, from the wireless device, a fourth signal, including location information of the satellite communication system and location information of a satellite, the at least one processing device processes the location information of the satellite communication system and the location information of the satellite to produce antenna adjustment parameters, which the at least one processing device provides to the wireless device for wireless transmission.

7. The satellite communication system of claim 1, wherein:
    when the at least one processing device receives a fourth signal from the wireless device, the at least one processing device sends a corresponding command to a remote processing device via the inter-facility link and an antenna of the outdoor unit, and
    when the at least one processing device receives a response from the remote processing device, via the antenna and the inter-facility link, the at least one processing device provides the response to the wireless device for wireless transmission to a receiving device for displaying.

8. A method for use with a satellite communication system, the method comprising:
    responsive to at least one processing device of a satellite modem receiving a first signal from a wireless device, outputting a first switch control signal to a switch to open a connection between an output unit power source, connected to the switch, and an inter-facility link connected to the switch, thereby preventing power from the outdoor unit power source from flowing through the inter-facility link;
    responsive to the at least one processing device receiving a second signal from the wireless device, outputting a second switch control signal to the switch to close the connection between the outdoor power unit source and the inter-facility link, thereby allowing the power to flow through the inter-facility link;
    responsive to the at least one processing device receiving a third signal from the wireless device, reading, by the at least one processing device, information received from a file; and
    providing, by the at least one processing device, the information to the wireless device for wireless transmission.

9. The method of claim 8, wherein the wireless device is a wireless router included in the satellite modem.

10. The method of claim 8, wherein the wireless device is external to the satellite modem and is physically connected to the satellite modem.

11. The method of claim 8, further comprising:
    responsive to receiving one of a plurality of signals via the wireless device, providing, by the at least one processing device, one of a plurality of control signals to at least one control logic unit to cause the at least one control logic unit to output a corresponding output control signal of a plurality of output control signals via a multiplexor connected to the inter-facility link.

12. The method of claim 11, wherein the plurality of output control signals include at least one of a first voltage to configure a first type of polarization of an antenna, a second voltage to configure a second type of polarization of the antenna, a first tone to select a first frequency band, a second tone to select a second frequency band, a continuous wave tone to enable cross polarization testing and adjustments, and a receive pointing on/off control signal for antenna alignment.

13. The method of claim 8, further comprising:
responsive to the at least one processing device receiving, from the wireless device, a fourth signal including location information of the satellite communication system and location information of a satellite, processing, by the at least one processing device, the location information of the satellite communication system and the location information of the satellite to produce antenna adjustment parameters, which the at least one processing device provides to the wireless device for wireless transmission.

14. The method of claim 8, further comprising:
responsive to the at least one processing device receiving a fourth signal from the wireless device, sending, by the at least one processing device, a corresponding command to a remote processing device via the inter-facility link and an antenna of the outdoor unit; and
responsive to the at least one processing device receiving a response from the remote processing device, via the antenna and the inter-facility link, providing, by the at least one processing device, the response to the wireless device for wireless transmission to a receiving device for displaying.

15. A system comprising:
a satellite modem;
an antenna of an outdoor unit;
an inter-facility link connecting the satellite modem with the antenna;
a portable processing device having a wireless communication interface; and
a wireless device having a physical connection to at least one processing device of the satellite modem, wherein:
when the wireless device receives a first command from the portable processing device, the wireless device provides the first command to the at least one processing device,
responsive to receiving the first command from the wireless device, the at least one processing device reads information from a file and provides the information to the wireless device,
in response to receiving the information from the at least one processing device, the wireless device wirelessly transmits the information to the portable processing device,
in response to receiving the information from the wireless device, the portable processing device displays a representation of the information on a display screen of the portable processing device.

16. The system of claim 15, wherein:
when the wireless device receives a second command from the portable processing device, the wireless device provides the second command to the at least one processing device;
responsive to the at least one processing device receiving the second command from the wireless device, the at least one processing device provides the second command to a satellite gateway via a network;
responsive to the at least one processing device providing the second command to the satellite gateway, the at least one processing device receives second information from the satellite gateway via the network and provides the second information to the wireless device for transmission to the portable processing device; and
responsive to the portable processing device receiving the second information from the wireless device, the portable processing device displays a representation of the second information on the display screen of the portable processing device.

17. The system of claim 15, wherein:
when the wireless device receives one of a plurality of commands from the portable processing device, the wireless device provides the one of the plurality of commands to the at least one processing device, and
responsive to receiving the one of the plurality of commands from the wireless device, the at least one processing device provides a corresponding one of a plurality of control signals to at least one control logic unit to cause the at least one control logic unit to output a corresponding output control signal of a plurality of output control signals over the inter-facility link.

18. The system of claim 15, wherein the satellite modem further comprises:
a multiplexor arranged to output to the inter-facility link;
a switch;
an outdoor power unit source connected to the switch, the switch being arranged to receive a switch control signal from the processing device, the switch control signal controlling the switch to either provide power to an outdoor unit via an inter-facility link or prevent the power from being provided to the outdoor unit via the inter-facility link, wherein:
when the wireless device receives a second command from the portable processing device, the wireless device provides the second command to the at least one processing device,
responsive to receiving the second command from the wireless device, the at least one processing device sends a first switch control signal to the switch to close a connection between the outdoor unit power source and the inter-facility link, thereby causing the power to flow through the inter-facility link,
when the wireless device receives a third command from the portable processing device, the wireless device provides the third command to the at least one processing device,
responsive to receiving the third command from the wireless device, the at least one processing device sends a second switch control signal to the switch to open a connection between the outdoor unit power source and the inter-facility link, thereby preventing the power from flowing through the inter-facility link.

* * * * *